United States Patent [19]

Ema et al.

[11] Patent Number: 5,742,729
[45] Date of Patent: Apr. 21, 1998

[54] VIDEO STORAGE TYPE COMMUNICATION DEVICE

[75] Inventors: Nobuyuki Ema, Nagareyama; Keiichi Hibi, Matsudo; Jiro Nakabayashi, Urawa; Tsuneaki Iwano, Tokyo; Osamu Nakamura, Han-no; Youji Kanada, Tokyo; Tsuneko Kura, Sagamihara; Takashi Oshima, Tokyo, all of Japan

[73] Assignees: Sharp Kabushiki Kaisha, Osaka; Nippon Telegraph and Telepone Corporation, Tokyo, both of Japan

[21] Appl. No.: 614,306

[22] Filed: Mar. 12, 1996

[30] Foreign Application Priority Data

Apr. 7, 1995 [JP] Japan ................. 7-082487

[51] Int. Cl.$^6$ ................. H04N 5/91; H04N 5/917
[52] U.S. Cl. ................. 386/68; 386/111
[58] Field of Search ................. 345/212, 185, 345/201; 386/68, 46, 109, 111, 112, 6, 7, 33; H04N 5/91, 5/917

[56] References Cited

U.S. PATENT DOCUMENTS 5,563,633  10/1996  Parsons ................. 345/202
5,568,200  10/1996  Pearlstein et al. ................. 348/426

FOREIGN PATENT DOCUMENTS 5-91497  4/1993  Japan.

Primary Examiner—Robert Chevalier

[57] ABSTRACT

A video storage type communication device stores video data received from a terminal and reproduces required video information by rapid forwarding or reversing at any desired frame rate at the terminal independent of the terminal specification. A video storage type communication device includes a transmitting portion for transmitting video data and a receiving portion for receiving video data over a communication line. A video storage portion stores received video data. A communication control portion carries out video communication by controlling the above-mentioned portions. A refresh image detecting portion judges, from the received video data, whether the received video data is a refresh image. A storage control portion adds inter-frame or intra-frame prediction coded information to the received video data in accordance with the determination by the refresh image detecting portion and stores the received video data in the video storage portion. A terminal control portion sends at a desired interval a request for updating a display image through the communication control portion to a terminal during storing of video information.

12 Claims, 4 Drawing Sheets

CONSTRUCTION OF VIDEO STORAGE TYPE COMMUNICATION DEVICE

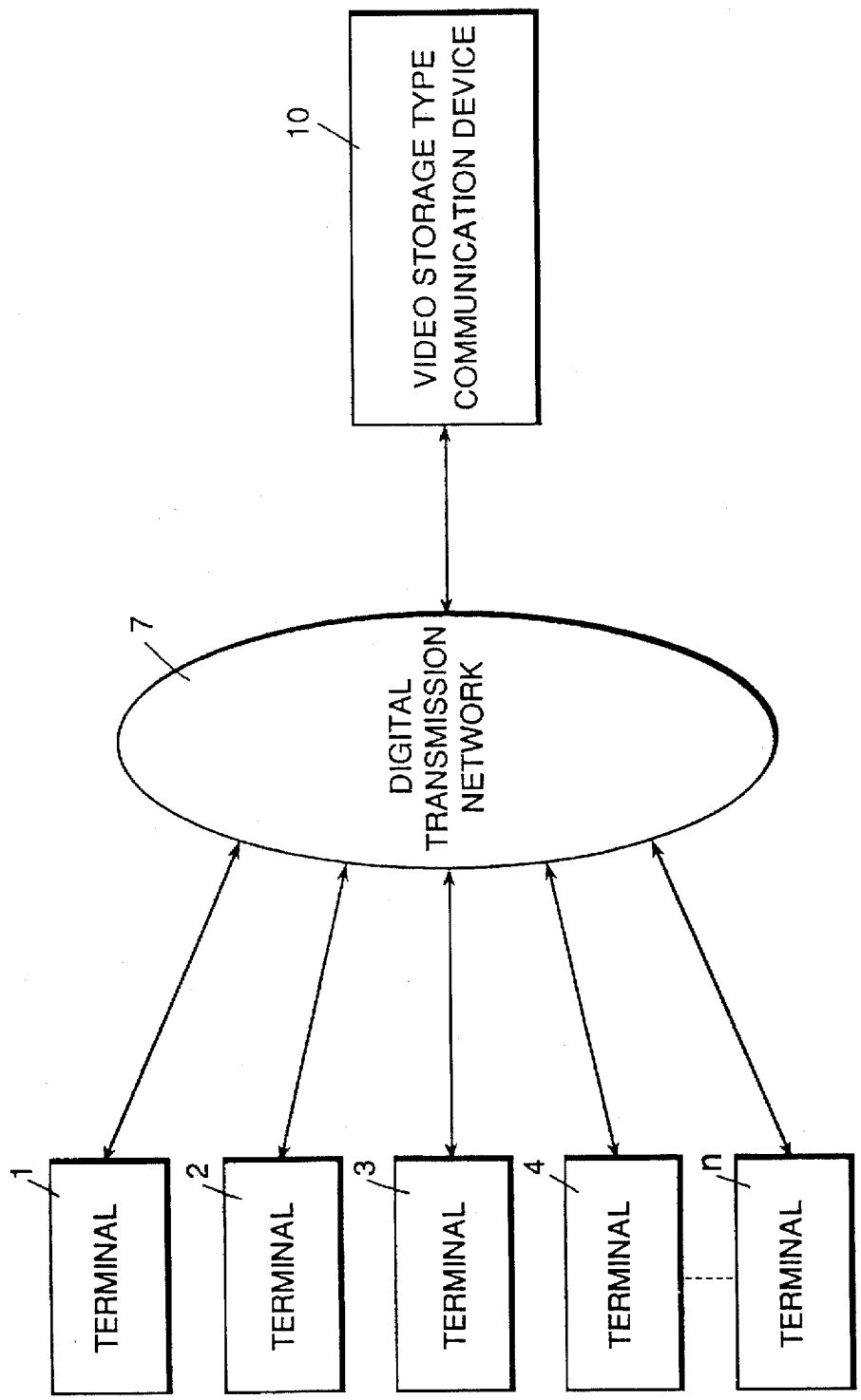

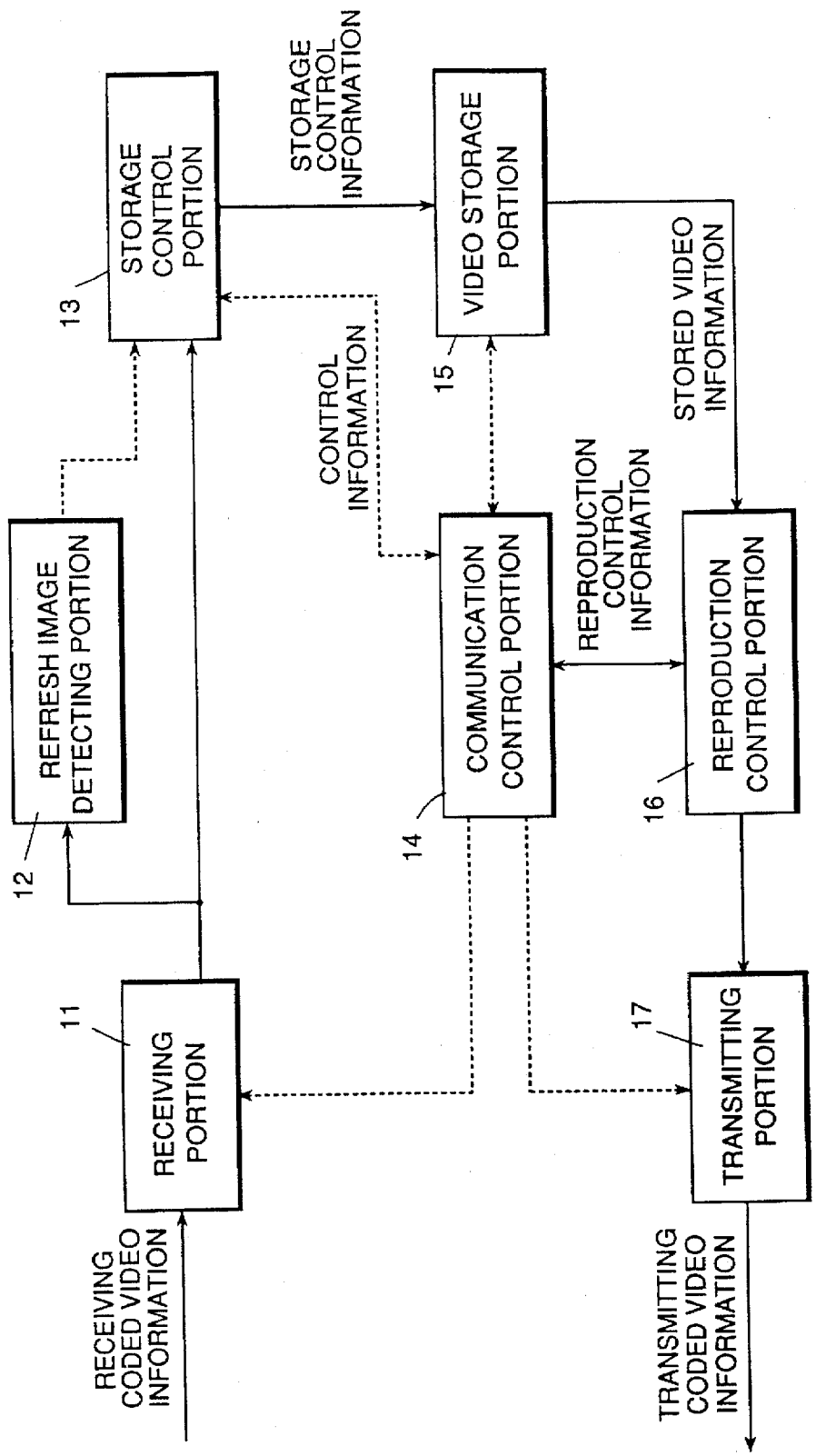
FIG.2 CONSTRUCTION OF A CONVENTIONAL VIDEO STORAGE AND COMMUNICATION DEVICE

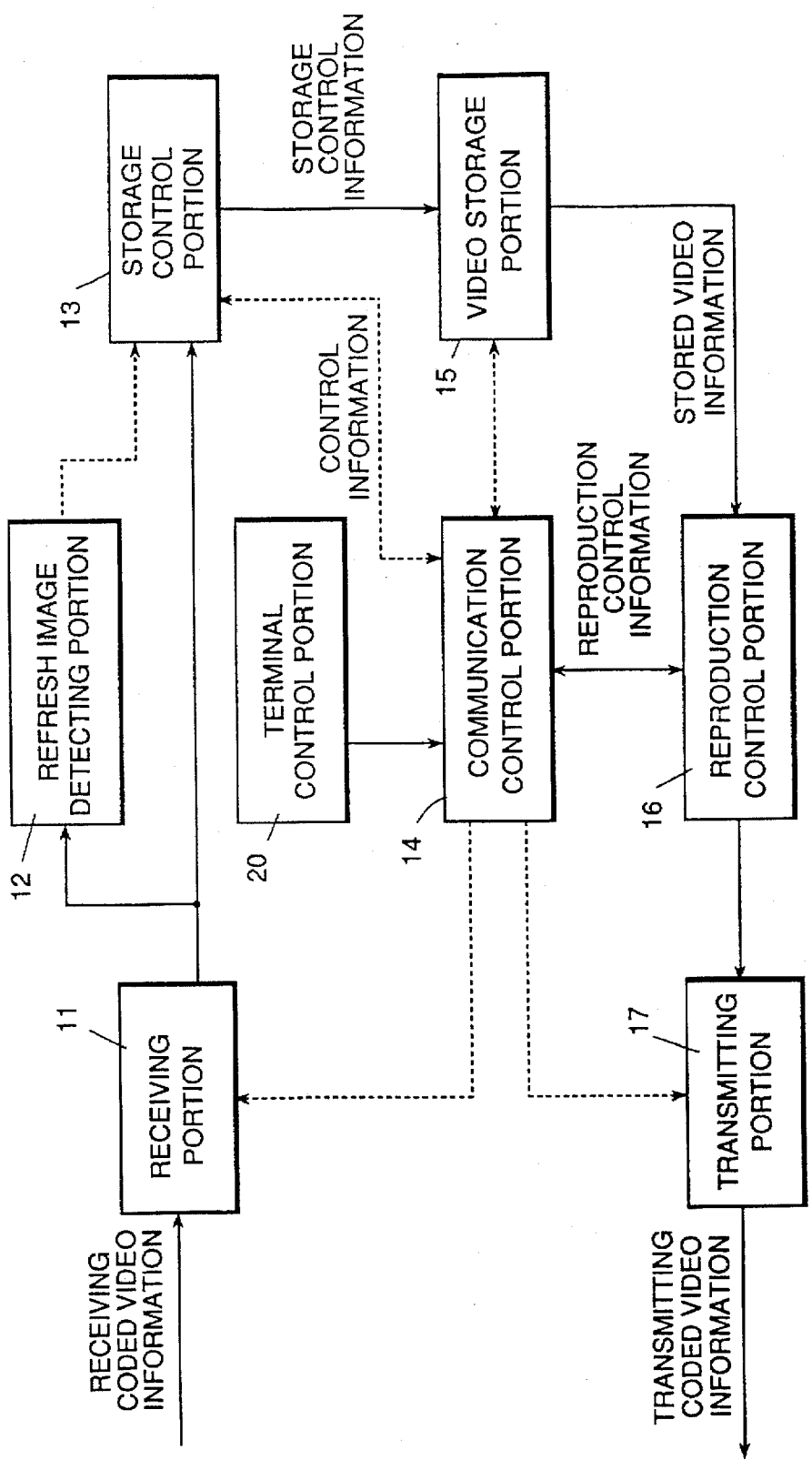
FIG.3 CONSTRUCTION OF VIDEO STORAGE TYPE COMMUNICATION DEVICE

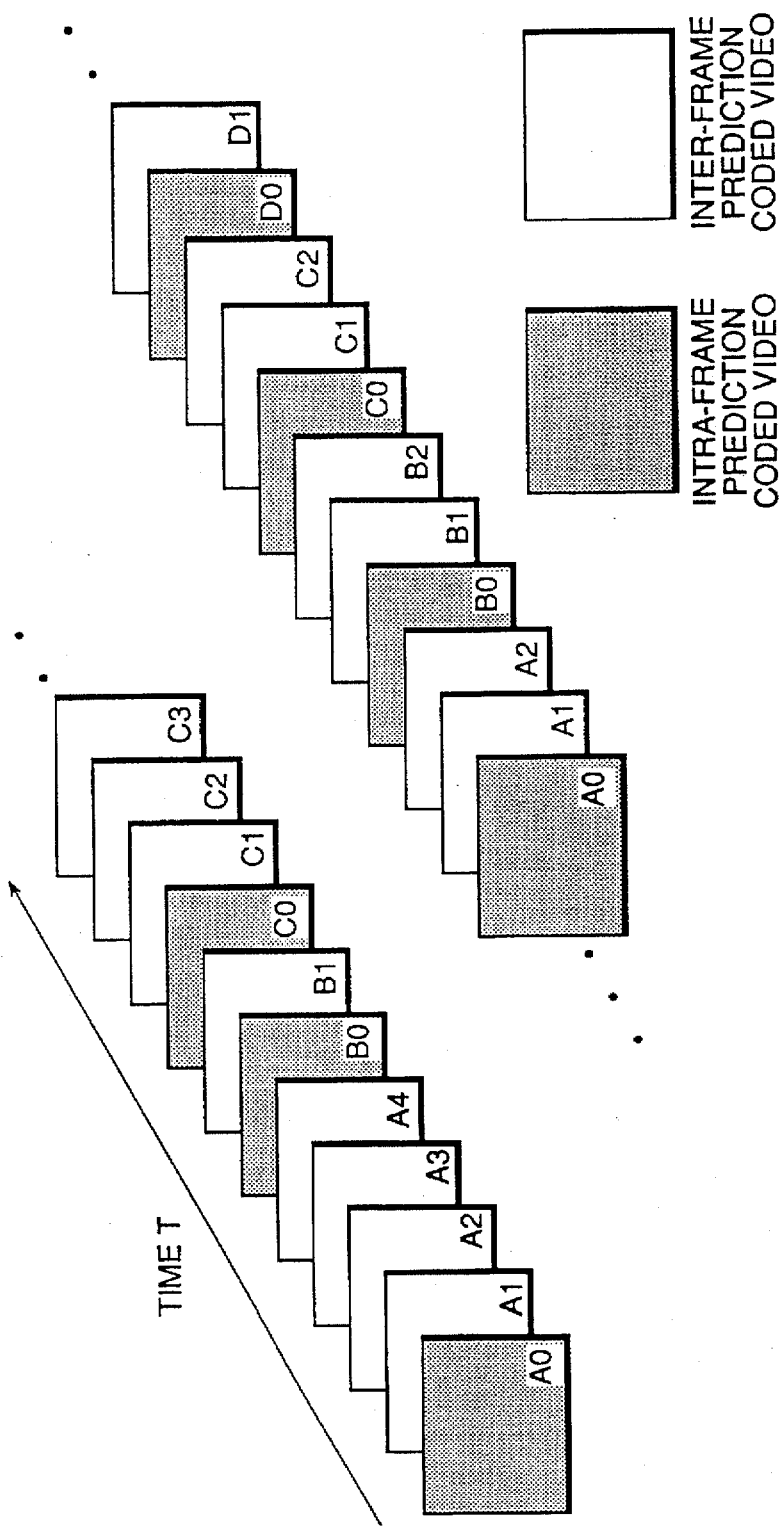

VIDEO STORAGE TYPE COMMUNICATION DEVICE

BACKGROUND OF THE INVENTION

1. Field of the Invention

The present invention relates to a video storage type communication device and more particularly to a video storage type communication device which is capable of sending at a desired interval a request for updating a screen image to a terminal, storing an image received from the terminal and making the stored video information be reproducible in a specified mode, for example, by rapid forwarding or reversing.

2. Description of the Background

Recently, with the spread and progress of digital transmission lines and the advance of image processing technology based upon the development of high speed digital signal processing methods and related LSI technology, there has been an increasing demand for development of effective methods of using video information services using high-speed digital communication networks, e.g., ISDN (Integrated Services Digital Networks). Video telecommunication services and a video conferencing services are well known as currently available video communication services. The most newly emerging services are video information database services which allow each user by using his audio-visual terminal set (hereinafter referred to as a terminal) to access a database storage (recording device) of a host center and to store therein or to obtain therefrom desired video information. One of these systems is a storage type communication device for use in a host center, which is intended to control storage of video information in a center storage and reproduction of the video information at each terminal from the host center.

The above-mentioned video-information database service includes terminals, a digital transmission network and a video storage type communication device. The video storage type communication device comprises a receiving portion, a refreshed image frame detecting portion, a storage control portion, a communication control portion, a video storage portion, a reproduction control portion, a transmitting portion and so on. The receiving portion and the transmitting portion are connected to the digital transmission network for communication with the terminals.

The storage type communication device is intended to be connected with the terminals which conform to the video coding method H.261 recommended by International Telecommunications Union (ITU) and Japanese standard JT-H.261 of Telecommunications Technical Committee.

In the video storage type communication services, it is desired to provide functions for reproducing video by rapid forwarding or rapid reversing. However, video data coded according to the recommendation H.261 is usually coded by inter-frame prediction coding method and, therefore, consists of differential information. If the first frame data is coded by the inter-frame prediction coding method, each receiving terminal can not reproduce the received frame data into a picture (i.e., a screenful) and therefore have only a confused screen image for a while. Therefore, data of the first frame shall be intra-frame (not inter-frame) prediction coded and stored. The recommendation H.261 proposes to periodically refresh the video data for preventing error accumulation due to inter-frame prediction coding and to periodically conduct an intra-frame prediction coding of video data. By using this opportunity, the frames of video data are stored in such a way that a frame of intra-frame prediction coded video data is placed at the head of a video data sequence. This makes it possible to perform rapidly forwarding and reversing reproduction of video information by thinning frames at a specified interval.

A video storage type communication device which realizes rapidly forwarding and reversing reproduction of images by using periodical refreshment is disclosed in Japanese Laid-Open Patent Publication No. 5-91497. The disclosed device is featured in that rapid feed control can always start from the intra-frame prediction coded data, i.e., the data of the intra-frame prediction coded head frame, assuring synchronized processing of visual data and audio data.

The above-mentioned periodical refreshment, however, depends upon terminals which may have different periods of intra-frame prediction coding, depriving the storage type communication device of the possibility of controlling a speed of rapidly feeding reproduction.

SUMMARY OF THE INVENTION

It is an object of the present invention to provide a video storage type communication device which has video storage capable of storing coded video data received from terminals and reproducing the video data not only by an ordinary method but also by special methods, e.g., by rapidly forwarding and reversing at a speed selectively adjustable independent of terminals used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a general construction view of a video communication system whereto the present invention is applied.

FIG. 2 is a construction view of a conventional video storage type communication device.

FIG. 3 is a construction view for explaining a video storage type communication device embodying the present invention.

FIG. 4A is illustrative of stored video frames in a conventional storage type communication device.

FIG. 4B is illustrative of stored video frames in a storage type communication device according to the present invention.

PREFERRED EMBODIMENT OF THE INVENTION

FIG. 1 is illustrative of a system of conducting a video-information database service, which includes terminals 1–n, a digital transmission network 7 and a video storage type communication device 10.

FIG. 2 is a detailed illustration of the video storage type communication device shown in FIG. 1. As shown in FIG.

2, the video storage type communication device 10 comprises a receiving portion 11, a refreshed image frame detecting portion 12, a storage control portion 13, a communication control portion 14, a video storage portion 15, a reproduction control portion 16, a transmitting portion 17. The receiving portion 11 and the transmitting portion 17 are connected to the digital transmission network 7 for communication with the terminals 1–n.

The storage type communication device 10 is intended to be connected with the terminals 1–n which conform to the video coding method H.261 recommended by International Telecommunications Union (ITU) and Japanese standard JT-H.261 of Telecommunications Technical Committee.

In the video storage type communication services, it is desired to provide functions for reproducing video by rapid forwarding or rapid reversing. However, video data coded according to the recommendation H.261 is usually coded by inter-frame prediction coding methods and, therefore, consists of differential information. If the first frame data is coded by the inter-frame prediction coding method, each receiving terminal can not reproduce the received frame data into a picture (i.e., a screenful) and therefore has only a confused screen image for a while. Therefore, data of the first frame shall be intra-frame (not inter-frame) prediction coded and stored. The recommendation H.261 proposes to periodically refresh the video data for preventing error accumulation due to inter-frame prediction coding and to periodically conduct an intra-frame prediction coding of video data. By using this opportunity, the frames of video data are stored in such a way that a frame of intra-frame prediction coded video data is placed at the head of a video data sequence. This makes it possible to reproduce video information by rapidly forwarding or reversing by thinning frames at a specified interval.

A video storage type communication device which realizes rapidly forwarding and reversing reproduction of images by using periodical refreshment is disclosed in Japanese Laid-Open Patent Publication No. 5-91497. The disclosed device is featured in that rapid feed control can always start from the intra-frame prediction coded data, i.e., the data of the intra-frame prediction coded head frame, assuring synchronized processing of visual data and audio data.

The above-mentioned periodical refreshment, however, depends upon terminals which may have different periods of intra-frame prediction coding, depriving the storage type communication device of the possibility of controlling a speed of rapidly feeding reproduction.

In view of the foregoing circumstances, the present invention was made to provide a video storage type communication device which has video storage capable of storing coded video data received from terminals and reproducing the video data not only by an ordinary method but also by special methods, e.g., by rapidly forwarding and reversing at a speed selectively adjustable independent of terminals used.

In the present invention, a host center (video storage type communication device) receives a refresh screen image (intra-frame prediction coded video data) from a terminal at any desired interval, adds thereto intra-frame and/or inter-frame prediction coded information as an identifier by its storage control portion and stores the image information in its video storage portion. At the time of reproducing, its reproduction control portion obtains video data from the storage portion by request and reproduces the video data by an ordinary method or by a rapidly forwarding or reversing method. In this case, a speed of rapid forwarding or reversing can be changed by controlling an interval of sending signals requiring a concerned terminal to update a display image.

FIG. 3 is a construction view for explaining a video storage type communication device embodying the present invention. In FIG. 3, numeral 20 designates a terminal control portion added according to the present invention. Other components similar in function to those of the prior art device of FIG. 2 are given the same reference numerals.

In the video storage type video communication device, similarly to the conventional art of FIG. 2, the coded video data received by the receiving portion 11 is transferred to the refreshed image frame detecting portion 12 and the storage control portion 13 under the control of a communication control portion 14. The coded video information is conventional video data encoded by a hybrid coding method that is a combination of motion compensated inter-frame prediction coding and intra-frame orthogonal transformation coding.

The refreshed image frame detecting portion 12 judges whether the received coded video information in a frame relates to a refreshed image by confirming said data in the frame is all intra-frame prediction coded. The storage control portion 13 receives information indicating intra-frame prediction coded data or inter-frame prediction coded data when the received coded video information is of a refreshed image (intra-frame prediction coded image) or not (inter-frame prediction coded data).

The terminal control portion 20 controls a terminal currently connected thereto while storing video information received from said terminal. It effects the communication control portion 14 to send a request for updating the display image to the terminal at a specified interval. The display image updating request is an image control command defined by the recommendations H.261, H.320 and H.230 of ITU. The terminal (visual telephone terminal or video conference terminal) receives the display updating request and immediately changes its display mode into the display updating mode to send a refresh display image. Intra-frame prediction coded video data (refresh display image) is thus obtained from the terminal by the effect of the display updating request from the terminal control portion 20 and is stored in the video information storage portion 15.

FIG. 4A shows an example of storing coded video data from a terminal into a video storage portion 15 using a conventional video storage type communication device 10 while FIG. 4B shows an example of storing coded video data into a video storage portion by using a video storage type communication device according to the present invention. In FIGS. 4A and 4B, frames A0, B0, C0 and D0 are of intra-frame prediction coded video data and frames A1–A4, B1–B2, C1–C3 and D1 are of inter-frame prediction coded video data. For easier understanding, such a case is described that coded data from the terminal can be transmitted at a constant frame rate (the number of frames to be transmitted per second). In case of FIG. 4B, video data coded in the intra-frame prediction mode is inserted at a specified interval. The frames of intra-frame prediction coded video data are inserted among the frames of inter-frame prediction coded video data at an interval of one in every three frames.

In reproduction of the stored video data, the communication control portion 14 directs the video storage portion 15 to read-out the stored coded video data therefrom. The communication control portion 14 also gives the reproduction control portion 16 reproduction control information necessary for ordinary reproduction or reproduction by rapidly forwarding or by rapidly reversing (e.g., information such as stored coded video data to be reproduced, direction relative to time axis, the number of frames per unit time for skipping reproduction). According to the information given by the communication control portion 14, the reproduction control portion 16 reads the required coded-video data from the storage portion 15 and transfers the data to the transmitting portion 17 which in turn transmits the received coded-video data to the terminal.

Referring to FIG. 4B, the stored coded-video data is transmitted to a terminal whereby it is reproduced in an ordinary mode, rapidly forwarding mode or rapidly reversing mode in the following sequences:

In ordinary reproduction, it is possible to transfer frames of intra-frame prediction coded video data and frames of video data coded by the motion compensative inter-frame prediction coding method. Therefore, frames A0, A1, A2, B0, B1, B2, C0, C1, C2, D0, D1 can be transmitted in the described order to the terminal.

In reproduction by rapidly forwarding, the frames of video data coded by the motion compensative inter-frame prediction coding method can not be transmitted to the terminal because the latter can not correctly perform predicted compensation. Therefore, only frames of intra-frame prediction coded video data are transmitted in the order of A0, B0, C0, D0 or A0, C0 and so on to the terminal.

In reproduction by rapidly reversing, like the reproduction by rapidly forwarding, only frames of intra-frame prediction coded video data are transmitted but in the reversed order of D0, C0, B0, A0 or D0, B0 and so on to the terminal.

With the video storage type communication device according to the present invention, it is possible to insert intra-frame prediction coded video data (frames) among the coded video data received from a terminal at any desired interval, thereby selectively obtaining the intra-frame prediction coded frames inserted at a desired interval and transmitting them to a terminal when conducting skipping reproduction of the video information thereat.

As is apparent from the foregoing, the present invention offers the following advantages:

(1) A video storage type communication device according to the present invention has a communication control portion capable of sending a display updating request to a terminal at any desired interval, whereby it can insert and store specially reproducible video information in a desired position among video information received from a terminal. This realizes flexible control of storing the specially reproducible video information, making it easier to control a skipping interval when reproducing video information in rapidly forwarding or reversing mode; and (2) A video storage type communication device according to the present invention has a reproduction control portion for controlling a call for video information from a video storage portion according to an instruction to be given by a communication control portion, making it possible to switch over reproducing modes (ordinary mode; rapid forwarding and rapid reversing mode) and to adjust a speed of rapid forwarding and reversing. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A video storage type communication device, comprising:

a transmitting portion for transmitting first video data over a communication line to at least one of a plurality of remote terminals;

a receiving portion for receiving second video data over the communication line from at least one of the plurality of remote terminals;

a video storage portion for storing the second video data;

a communication control portion for carrying-out video-communications by controlling said transmitting, receiving and video storage portions;

a refresh image detecting portion for judging, from the second video data, whether a frame of the second video data is a refresh image;

a storage control portion for storing the second video data received by said receiving portion in said video storage portion by adding thereto inter-frame and/or intra-frame prediction coded information in accordance with the judgement by said refresh image detecting portion; and a terminal control portion for sending at a desired interval a request for updating a display image to the at least one of the remote terminals during storage of the second video data.

2. The video storage type communication device according to claim 1, further comprising:

a reproduction control portion for controlling a call from the at least one of the remote terminals for reproducible video information from said video storage portion according to an instruction given from said communication control portion, said reproduction control portion selectively providing the second video data as the first video data ordinarily reproducible and reproducible by rapidly forwarding or reversing.

3. A video storage communication apparatus comprising:

communication means, coupled to at least one of a plurality of remote terminals via a communication network, for transmitting and receiving video information including intra-frame and inter-frame prediction coded data on the communication network;

a video storage unit;

determination means, coupled to said communication means, for determining if a frame of the video information received over the communication network is a refresh screen image consisting of intra-frame prediction coded data; and control means, coupled to said communication means and said determination means, for a) adding intra-frame/inter-frame identification data to the frame of the video information in accordance with determination by said determination means, b) storing the frame of the video information having added identification data in said video storage unit, c) transmitting at preselected intervals a request to transmit a refresh screen image to the at least one of the remote terminals through said communication means, and d) reading out the stored video information from said video storage unit and transmitting the read video information via said communication means to the at least one of the remote terminals in response to a call for video information by the at least one of the remote terminals.

4. The video storage communication apparatus of claim 3, wherein the stored video information is readable by said control means in an ordinary reproduction mode, a rapid forwarding mode and a rapid reversing mode and the read video information is transmitted to the at least one of the remote terminals in one of the ordinary reproduction, rapid forwarding or rapid reversing modes via said communication means.

5. The video storage communication apparatus of claim 4, wherein the read video information in the ordinary reproduction mode comprises inter-frame prediction coded data and intra-frame prediction coded data.

6. The video storage communication apparatus of claim 4, wherein the read video information in the rapid forwarding and rapid reversing modes comprises only intra-frame prediction coded data.

7. The video storage communication apparatus of claim 3, wherein said control means stores the video information in said video storage unit such that there is a specified interval of inter-frame prediction coded data between intra-frame prediction coded data.

8. A method of storing and retrieving video information including intra-frame and inter-frame prediction coded data in a video storage communication apparatus coupled to at least one of a plurality of remote terminals via a communication network comprising the steps of:

a) determining if a frame of video information received over the communication network is a refresh screen image consisting of intra-frame prediction coded data;

b) adding intra-frame/inter-frame identification data to the frame of the video information in accordance with the determination in said step a);

c) storing the frame of the video information having added identification data in a video storage unit of the video storage communication apparatus;

d) transmitting at preselected intervals a request to transmit a refresh screen image to the at least one of the remote terminals via the communication network; and e) reading out the stored video information from the video storage unit and transmitting the read video information via the communication network to the at least one of the remote terminals in response to a call for video information by the at least one of the remote terminals.

9. The method of storing and retrieving video information of claim 8, wherein the stored video information is readable in said step e) in an ordinary reproduction mode, a rapid forwarding mode and a rapid reversing mode and the read video information is transmitted to the at least one of the remote terminals in one of the ordinary reproduction, rapid forwarding and rapid reversing modes.

10. The method of storing and retrieving video information of claim 9, wherein the read video information in the ordinary reproduction mode comprises inter-frame prediction coded data and intra-frame prediction coded data.

11. The method of storing and retrieving video information of claim 9, wherein the read video information in the rapid forwarding and the rapid reversing modes comprises only intra-frame prediction coded data.

12. The method of storing and retrieving video information of claim 8, wherein the video information is stored in the video storage unit in said step c) such that there is a specified interval of inter-frame prediction coded data between intra-frame prediction coded data.

\* \* \* \* \*